(12) United States Patent
Dehaan et al.

(10) Patent No.: US 7,983,178 B2
(45) Date of Patent: Jul. 19, 2011

(54) FIBRE CHANNEL FABRIC SIMULATOR

(75) Inventors: David F. Dehaan, Tucson, AZ (US);
Louie A. Dickens, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 11/549,837

(22) Filed: Oct. 16, 2006

(65) Prior Publication Data

US 2008/0089319 A1    Apr. 17, 2008

(51) Int. Cl.
*G01R 31/08* (2006.01)
(52) U.S. Cl. ............. 370/250; 370/360; 703/21; 703/22
(58) Field of Classification Search .................. 370/241; 707/782; 709/224; 711/113, 130
See application file for complete search history.

(56) References Cited

U.S. PATENT DOCUMENTS

| | | | |
|---|---|---|---|
| 5,748,617 A | 5/1998 | McLain, Jr. | |
| 6,324,492 B1 | 11/2001 | Rowe | |
| 6,421,723 B1 * | 7/2002 | Tawil | 709/224 |
| 6,769,054 B1 | 7/2004 | Sahin et al. | |
| 6,892,174 B1 | 5/2005 | Gaspar | |
| 7,315,807 B1 * | 1/2008 | Lavallee et al. | 703/21 |
| 7,418,546 B2 * | 8/2008 | Taguchi et al. | 711/112 |
| 7,478,026 B1 * | 1/2009 | Kushner et al. | 703/13 |
| 2003/0130833 A1 | 7/2003 | Brownell et al. | |
| 2004/0136325 A1 | 7/2004 | Dobric et al. | |
| 2005/0262233 A1 * | 11/2005 | Alon et al. | 709/223 |
| 2006/0090136 A1 | 4/2006 | Miller et al. | |
| 2006/0227716 A1 * | 10/2006 | Chandrasekaran et al. | 370/252 |
| 2008/0089320 A1 | 4/2008 | Dehaan et al. | |

OTHER PUBLICATIONS

Office Action 1 for U.S. Appl. No. 11/549,842, dated Mar. 17, 2010, 14 pp. (CLG1 OA1).

* cited by examiner

*Primary Examiner* — Seema S Rao
*Assistant Examiner* — Sai-Ming Chan
(74) *Attorney, Agent, or Firm* — Rabindranath Dutta; Konrad Raynes & Victor LLP

(57) ABSTRACT

A fabric simulation device implementing a method for generating a simulated fabric of a simulated storage area network. In operation, the fabric simulation device logs into a physical storage area network as an unofficial physical fiber channel switch connected to the simulated storage area network, and maintains a fabric testing relationship between the physical storage area network and the simulated storage area network based on being logged into the physical storage area network as the unofficial physical fiber channel switch.

5 Claims, 4 Drawing Sheets

FIBRE CHANNEL FABRIC SIMULATOR

FIELD OF THE INVENTION

The present invention generally relates to a fibre channel storage area network ("SAN") employing a number of fibre channel switches which are connected together to form a fabric. The present invention specifically relates to a technique for simulating one or more fibre channel switch fabrics connected to a physical SAN and for simulating one or more end devices attached to the simulated fibre channel switch fabric(s).

BACKGROUND OF THE INVENTION

FIG. 1 illustrates a physical SAN 10 employing one or more physical fibre channel switches 20 and a plurality of physical end devices 30. As known in the art, fibre channel switch(es) 20 are used to establish a fibre channel communication network topology (i.e., fabric) providing direct connections between physical end devices 30 (e.g., personal computers, workstations, servers and the like). Currently, a testing of the fibre channel communication network topology requires the use of a large quantity of expensive equipment, particularly a large quantity of additional physical fibre channel switches 20 and physical end devices 30 for testing purposes. One of the most prevalent problems encountered in the fabric is the ability of physical fibre channel switch(es) 20 to manage a name server database with a large number of entries. This problem is most exposed when there are constant changes to the name server database node caused by physical end devices 30 logging into and out of the fabric. Presently, the only method to populate a large name server database is to physically install a large number of physical fibre channel switches 20 and physical end devices 30 into the fabric. Thus, a technique for deceiving the fabric into thinking there are more physical end devices 30 attached to the fabric then there actually are would be beneficial in saving configuration time and reducing hardware cost.

SUMMARY OF THE INVENTION

The present invention provides a new and unique fabric simulator device implementing a method for generating a simulated fabric of a simulated storage area network.

One form of the present invention is a computer readable medium tangibly embodying a program of machine-readable instructions executable by a processor to perform operations for generating the simulated fabric of the simulated storage area network. The operations comprise a logging into a physical storage area network as an unofficial physical fibre channel switch connected to a simulated storage area network, and a maintaining of a fabric testing between the physical storage area network and the simulated storage area network based on being logged into the physical storage area network as the unofficial physical fibre channel switch.

A second form of the present invention is a fabric simulation device comprising a processor, and a memory storing instructions operable with the processor for generating the simulated fabric of the simulated storage area network. The instructions are executed for logging into a physical storage area network as an unofficial physical fibre channel switch connected to the simulated storage area network, and for maintaining a fabric testing between the physical storage area network and the simulated storage area network based on being logged into the physical storage area network as the unofficial physical fibre channel switch.

A third form of the present invention is a method for generating the simulated fabric of the simulated storage area network. The method involves a logging into a physical storage area network as an unofficial physical fibre channel switch connected to the simulated storage area network, and a maintaining of a fabric testing between the physical storage area network and the simulated storage area network based on being logged into the physical storage area network as the unofficial physical fibre channel switch.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
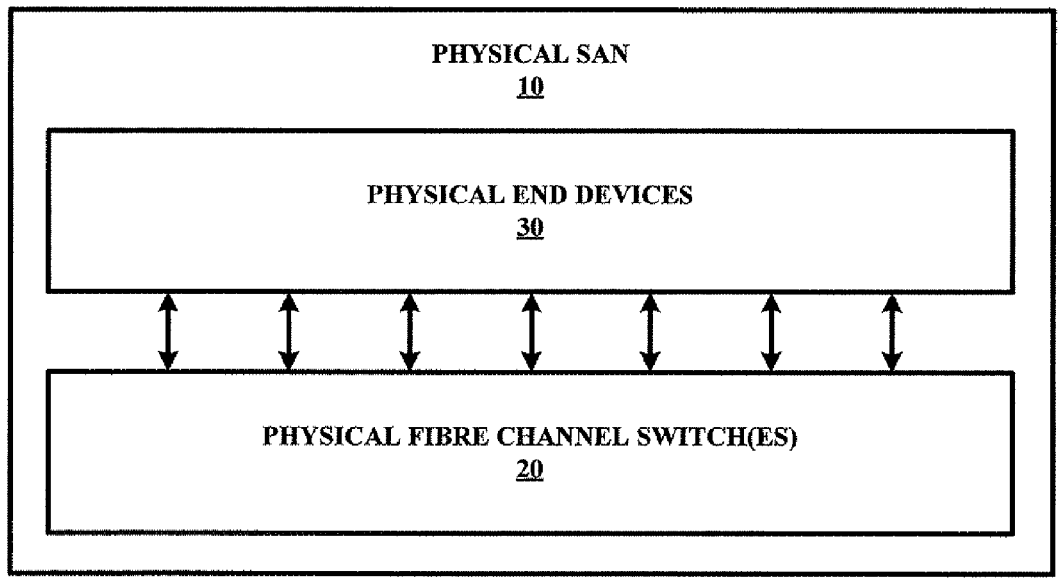
FIG. 1 illustrates an exemplary physical storage area network as known in the art.
Figure 2:
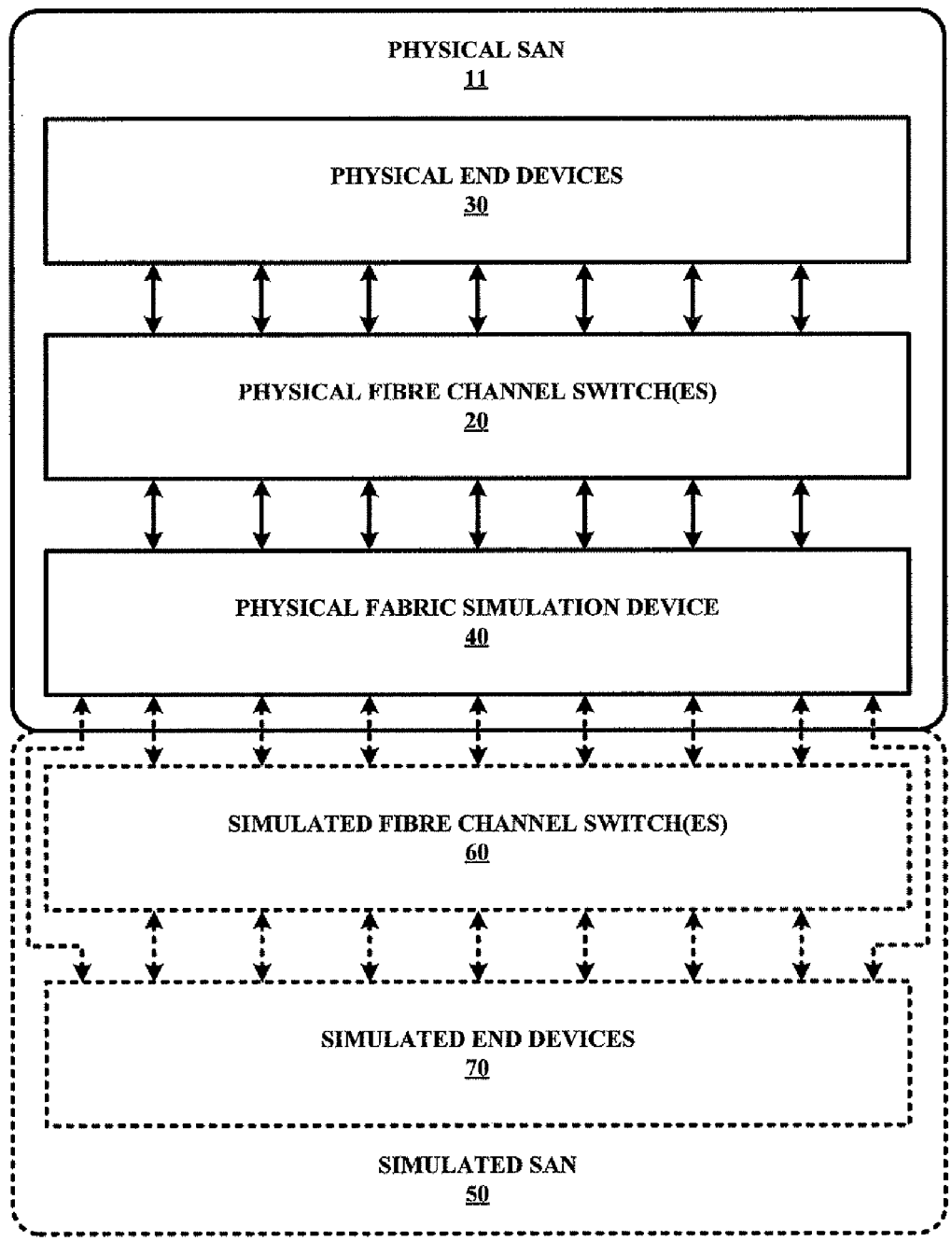
FIG. 2 illustrates one embodiment of a simulated storage area network in accordance with the present invention.

FIG. 2 illustrates a physical SAN 11 employing one or more physical fibre channel switches 20 and a plurality of physical end devices 30 as known in the art, and a fabric simulation device 40 of the present invention. Fabric simulation device 40 is structurally configured with software, hardware, and/or firmware to serve as up to a X number of physical fibre channel switches within physical SAN 11 that are connected to fabric simulation device 40, where $X \geq 1$. Fabric simulation device 40 is further structurally configured with software, hardware, and/or firmware to generate a simulated SAN 50 having one or more simulated fibre channel switches 60 and/or one or more simulated end devices 70 that are connected to fabric simulation device 40. In practice, simulated SAN 50 consists of a Y number of simulated fibre channel switches 60, where $Y \geq 0$, and a Z number of simulated end devices 70, where $Z \geq 1$.

Figure 3:
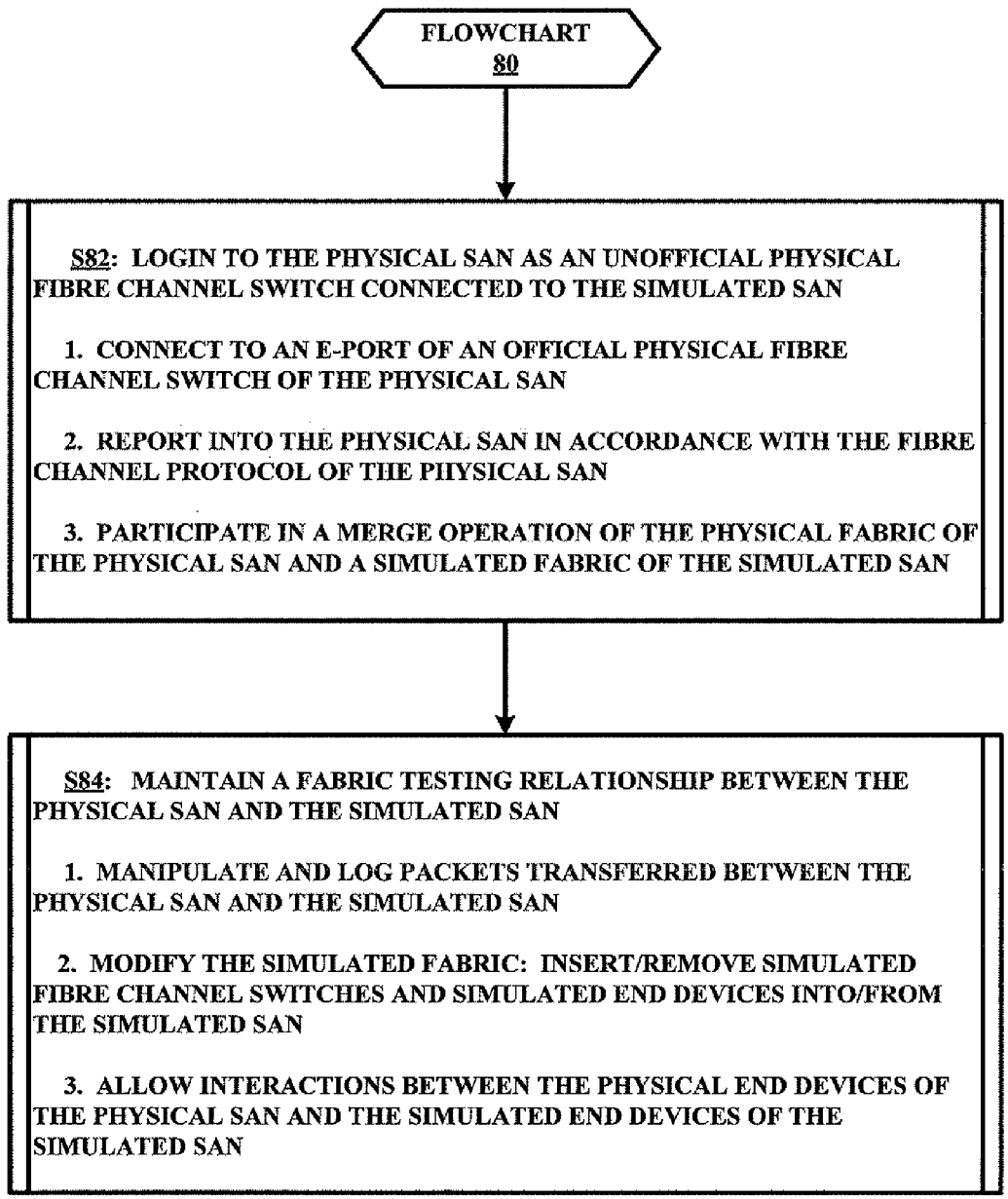
FIG. 3 illustrates a flowchart representative of one embodiment of a fabric simulation method in accordance with the present invention.

FIG. 3 illustrates a flowchart 80 representative of a fabric simulation method of the present invention. To facilitate a general understanding of the fabric simulation method of the present invention, flowchart 80 will be described herein in the context of being executed by fabric simulation device 40.

A stage S82 of flowchart 80 encompasses fabric simulation device 40 logging in to physical san 11 as a physical fibre channel switch connected to simulated SAN 50. For purposes of clearly distinguishing physical fibre channel switch(es) 20 from the physical fibre channel switch function implemented by fabric simulation device 40, each physical fibre channel switch 20 will be hereafter identified as an "official" physical fibre channel switch as an indication that these switches are intended to be official operating components of physical SAN 11, and fabric simulation device 40 will be hereafter identified as an "unofficial" physical fibre channel switch as an indication that fabric simulation device 40 is intended to a testing component of physical SAN 11. Thus, the terms "official" and "unofficial" as used herein neither limits nor restricts the structural scope of the term "physical fibre channel switch" as known in the art.

Still referring to FIG. 3, in one embodiment as shown, stage S82 involves an execution of several pre-testing procedures by unofficial physical fibre channel switch 40. A first pre-test procedure is unofficial physical fibre channel switch 40 being physically connected to an E-port of an official physical fibre channel switch 20 to enable fabric configuration and management. A second pre-test procedure is unofficial physical fibre channel switch 40 reporting into physical SAN 11 in accordance with a known fibre channel protocol. A third pre-test procedure is unofficial physical fibre channel switch 40 participating in a known merge operation of the physical fabric of physical SAN 11 and a simulated fabric of simulated SAN 50.

Thereafter, unofficial physical fibre channel switch 40 proceeds to a stage S84 of flowchart 80 to maintain a fabric testing relationship between physical SAN 11 and simulated SAN 50. In one embodiment, stage S84 involves an execution of several testing procedures by unofficial physical fibre channel switch 40. One testing procedure includes unofficial physical fibre channel switch 40 manipulating and a logging of packets transferred between physical SAN 11 and simulated SAN 50. A second testing procedure includes unofficial physical fibre channel switch 40 modifying of simulated SAN 50 by selectively inserting and/or removing fibre channel switches 60 and end devices 70 into/from simulated SAN 50 for purposes of testing an operational capacity and responsiveness of physical SAN 11. A third testing procedure includes unofficial physical fibre channel switch 40 allowing interactions between physical end devices 30 of physical SAN 11 and simulated end devices 70 of simulated SAN 50.

Figure 4:
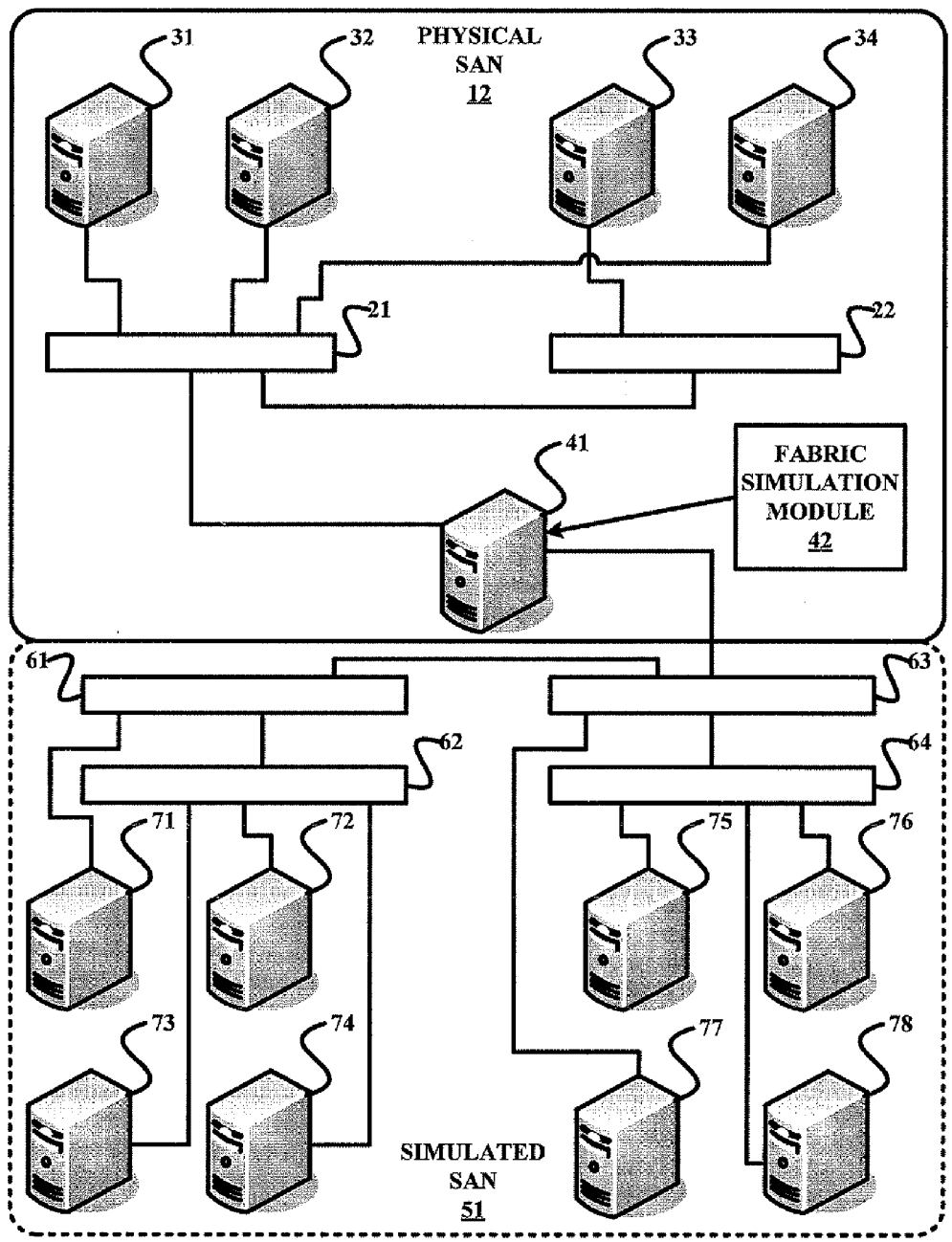
FIG. 4 illustrates an exemplary embodiment of the simulated storage area network illustrated in FIG. 2 in accordance with the present invention.

To facilitate a more specific understanding of the fabric simulation method of the present invention, flowchart 80 will be described herein in the context of being executed by a fabric simulation server 41 as shown in FIG. 4. Specifically, a physical SAN 12 employs two official (2) physical fibre channel switches 21 and 22, and four (4) physical servers 31-34 of which servers 31, 32, 34 are connected to N-ports of fibre channel switch 21 and server 33 is connected to a N-port of fibre channel switch 22.

Fabric simulation server 41 is connected to an E-port of fibre channel switch 21 to serve as the unofficial physical fibre channel switch within physical SAN 12. A fabric simulation module 42 is installed in a memory (not shown) of fabric simulation device 40 whereby a processor (not shown) of fabric simulation device 40 can generate a simulated SAN 51 having four (4) simulated fibre channel switches 61-64 and eight (8) simulated servers 71-78. Fabric simulation device 40 is connected to an E-port of simulated fibre channel switch 63. A pair of E-ports of simulated fibre channel switch 63 are connected to an E-port of simulated fibre channel switch 61 and an E-port of fibre channel switch 64. An E-port of simulated fibre channel switch 61 is connected to an E-port of fibre channel switch 62.

Simulated server 71 is connected to an N-port of simulated fibre channel switch 61. Simulated servers 72-74 are connected to N-ports of simulated fibre channel switch 62. Simulated server 77 is connected to an N-port of simulated fibre channel switch 63. Simulated servers 75, 76, 78 are connected to N-ports of simulated fibre channel switch 64.

A stage S82 of flowchart 80 encompasses fabric simulation server 41 logging in to physical san 12 as the unofficial fibre channel switch connected to simulated SAN 51. In one embodiment, stage S82 involves an execution of several pre-testing procedures by unofficial physical fibre channel switch 41. A first pre-test procedure is unofficial physical fibre channel switch 41 being physically connected to an E-port of an official physical fibre channel switch 21 to enable fabric configuration and management. A second pre-test procedure is unofficial physical fibre channel switch 41 reporting into physical SAN 12 in accordance with a known fibre channel protocol. A third pre-test procedure is unofficial physical fibre channel switch 41 participating in a known merge operation of the physical fabric of physical SAN 12 and a simulated fabric of simulated SAN 51.

Thereafter, unofficial physical fibre channel switch 41 proceeds to stage S84 maintain a fabric testing relationship between physical SAN 12 and simulated SAN 51. In one embodiment, stage S84 involves an execution of several testing procedures by unofficial physical fibre channel switch 41. One testing procedure includes unofficial physical fibre channel switch 41 manipulating and a logging of packets transferred between physical SAN 12 and simulated SAN 51. A second testing procedure includes unofficial physical fibre channel switch 41 modifying simulated SAN 51 by selectively inserting additional simulated fibre channel switches and/or simulated servers into simulated SAN 50 and removing simulated fibre channel switches and/or simulates servers from simulated SAN for purposes of testing an operational capacity and responsiveness of physical SAN 12. A third testing procedure includes unofficial physical fibre channel switch 41 allowing interactions between physical servers 31-34 of physical SAN 12 and simulated servers 71-78 of simulated SAN 51.

The importance of stage S84 is best understood in the context of name server databases, integral components of the physical switches 21-22, that are updated as simulated end devices log in and out of the physical fabric of physical SAN 12 based on the selective insertion/removal of simulated devices into/from simulated SAN 51.

Referring to FIGS. 2-4, those having ordinary skill in the art will appreciate various benefits and advantages of the present invention, including, but not limited to, a manageable and effective technique for testing a physical Fabric of a physical SAN.

The term "processor" as used herein is broadly defined as one or more processing units of any type for performing all arithmetic and logical operations and for decoding and executing all instructions related to facilitating an implementation by a fabric simulator device of the various methods of the present invention. Additionally, the term "memory" as used herein is broadly defined as encompassing all storage space in the form of signal readable mediums of any type within a fabric simulator device.

Furthermore, those having ordinary skill in the art of fabric testing techniques may develop other embodiments of the present invention in view of the inventive principles of the present invention described herein. Thus, the terms and expression which have been employed in the foregoing specification are used herein as terms of description and not of limitations, and there is no intention in the use of such terms and expressions of excluding equivalents of the features shown and described or portions thereof, it being recognized that the scope of the present invention is defined and limited only by the claims which follow.

We claim:

1. A non-transitory computer readable medium tangibly embodying a program of machine-readable instructions executable by a processor to perform operations for generating a simulated fabric of a simulated storage area network, the operations comprising:

logging into a physical storage area network as an unofficial physical fibre channel switch connected to the simulated storage area network, wherein the logging into the physical storage area network as the unofficial physical fibre channel switch connected to the simulated storage area network includes participating in a merge operation of a physical fabric of the physical storage area network and a simulated fabric of the simulated storage area network, wherein a fabric is a fibre channel communication network topology, wherein the physical storage area network is a first network and the simulated storage area network is a simulation of a second storage area network; and maintaining a fabric testing between the physical storage area network and the simulated storage area network based on being logged into the physical storage area network as the unofficial physical fibre channel switch, wherein the simulated fabric is modified by at least one of: inserting at least one simulated fibre channel switch into the simulated storage area network, inserting at least one simulated end device into the storage area network, removing at least one simulated fibre channel switch from the storage area network, and removing at least one simulated end device from the storage area network.

2. The non-transitory computer readable medium of claim 1, wherein the logging into the physical storage area network as the unofficial physical fibre channel switch connected to the simulated storage area network includes:

connecting into an E-port of an official physical fibre channel switch of the physical storage area network.

3. The non-transitory computer readable medium of claim 1, wherein the logging into the physical storage area network as the unofficial physical fibre channel switch connected to the simulated storage area network includes:

reporting into the physical storage area network as the unofficial physical fibre channel switch in accordance with a fibre channel protocol of the physical storage area network.

4. The non-transitory computer readable medium of claim 1, wherein the maintaining of the fabric testing between the physical storage area network and the simulated storage area network based on being logged into the physical storage area network as the unofficial physical fibre channel switch includes:

manipulating and logging each packet transferred between the physical storage area network and the simulated storage area network.

5. The non-transitory computer readable medium of claim 1, wherein the maintaining of the fabric testing between the physical storage area network and the simulated storage area network based on being logged into the physical storage area network as the unofficial physical fibre channel switch includes:

allowing interactions between at least one physical end device of the physical storage area network and at least one simulated end device of the simulated storage area network.

\* \* \* \* \*